United States Patent
Leijon et al.

(10) Patent No.: US 9,157,412 B2
(45) Date of Patent: Oct. 13, 2015

(54) STATOR FRAME FOR A SUBMERGED LINEAR GENERATOR

(75) Inventors: Mats Leijon, Uppsala (SE); Erik Doré, Ludvika (SE); Fredrik Axelsson, Uppsala (SE); Rafael Waters, Uppsala (SE)

(73) Assignee: Seabased AB, Uppsala (SE)

( * ) Notice: Subject to any disclaimer, the term of this patent is extended or adjusted under 35 U.S.C. 154(b) by 42 days.

(21) Appl. No.: 13/700,309

(22) PCT Filed: May 28, 2010

(86) PCT No.: PCT/SE2010/050586
§ 371 (c)(1),
(2), (4) Date: Jan. 31, 2013

(87) PCT Pub. No.: WO2011/149398
PCT Pub. Date: Dec. 1, 2011

(65) Prior Publication Data
US 2013/0147198 A1    Jun. 13, 2013

(51) Int. Cl.
*F03B 13/10* (2006.01)
*F03B 13/12* (2006.01)
(Continued)

(52) U.S. Cl.
CPC ............... *F03B 13/14* (2013.01); *H02K 1/185* (2013.01); *H02K 5/00* (2013.01); *H02K 5/12* (2013.01); *H02K 7/1876* (2013.01); *H02K 15/00* (2013.01);
(Continued)

(58) Field of Classification Search
CPC ....... Y02E 10/38; F03B 13/12; F03B 13/105; F03B 13/1815; F03B 13/22; F03B 3/16; F02G 2280/10; F05B 2240/90; F05B 2240/97; F05B 2220/706; E02B 9/08; H02K 35/00; H02K 1/18; F03D 11/04
USPC .......... 310/12.02, 12.13, 12.15, 12.24–12.26, 310/12.33, 12.01, 87, 15, 179, 91, 217; 417/330, 331; 415/7, 213.1; 405/76, 405/224; 290/1 R, 53, 42, 54; 60/495–502
See application file for complete search history.

(56) References Cited

U.S. PATENT DOCUMENTS 5,654,596 A * 8/1997 Nasar et al. ................. 310/12.15
5,875,540 A * 3/1999 Sargeant et al. ................ 29/596
(Continued)

FOREIGN PATENT DOCUMENTS

JP    4810512    2/1973
JP    5513619    1/1980
(Continued)

OTHER PUBLICATIONS

English Abstract of JP2005256676.
(Continued)

*Primary Examiner* — Tulsidas C Patel
*Assistant Examiner* — Charles Reid, Jr.
(74) *Attorney, Agent, or Firm* — Dykema Gossett PLLC

(57) ABSTRACT

The invention relates to a stator frame (12) for a submerged linear generator. According to the invention the stator frame (12) includes a cylindrical tube of metal with mounting means (13, 14, 15, 16) for mounting stator packages to the inside wall of the tube. The stator frame (12) also is the external circumferential wall of the linear generator. The invention also relates to the use of such a stator frame (12) and to a method for manufacturing a linear generator with such a stator frame (12).

31 Claims, 4 Drawing Sheets

(51) Int. Cl.
*H02P 9/04* (2006.01)
*H02K 5/00* (2006.01)
*H02K 15/00* (2006.01)
*F03B 13/14* (2006.01)
*H02K 1/18* (2006.01)
*H02K 5/12* (2006.01)
*H02K 35/02* (2006.01)
*H02K 7/18* (2006.01)

(52) U.S. Cl.
CPC ............... *H02K 35/02* (2013.01); *Y02E 10/38* (2013.01); *Y10T 29/49009* (2015.01)

(56) References Cited

U.S. PATENT DOCUMENTS

| | | | | |
|---|---|---|---|---|
| 6,020,653 | A * | 2/2000 | Woodbridge et al. | 290/53 |
| 7,164,212 | B2 * | 1/2007 | Leijon et al. | 290/42 |
| 7,397,163 | B2 * | 7/2008 | Cook et al. | 310/216.051 |
| 7,405,489 | B2 * | 7/2008 | Leijon et al. | 290/42 |
| 7,861,404 | B2 * | 1/2011 | Fayewicz et al. | 29/729 |
| 2007/0090652 | A1 * | 4/2007 | Leijon et al. | 290/53 |
| 2009/0302720 | A1 * | 12/2009 | Chiba | 310/75 R |
| 2010/0033016 | A1 | 2/2010 | Thorburn et al. | |
| 2010/0117367 | A1 * | 5/2010 | Muller et al. | 290/53 |
| 2011/0175360 | A1 | 7/2011 | Leijon et al. | |

FOREIGN PATENT DOCUMENTS

| | | |
|---|---|---|
| JP | 2003224960 | 8/2003 |
| JP | 2004064960 | 2/2004 |
| JP | 2005256676 | 9/2005 |
| JP | 2010074979 | 9/2008 |
| RU | 20414 | 10/2001 |
| WO | 03058055 | 7/2003 |

OTHER PUBLICATIONS

English Abstract of JP 55013619.
English Abstract of JP 2004064960.
English Abstract of JP 2010074979.
English Abstract of JP 2003224960.

* cited by examiner

STATOR FRAME FOR A SUBMERGED LINEAR GENERATOR

FIELD OF INVENTION

The present invention in a first aspect relates to a stator frame for a submerged linear generator.

In a second aspect the invention relates to a use of such a stator frame, and in a third aspect to a method for manufacturing a linear generator with such a stator frame.

In the present application the terms "radial", "axial", "lateral" and the like refer to the direction of the axis defined by the reciprocating movement of centre of the translator, i.e. the centre axis if not explicitly otherwise is stated. The terms "upper" and "lower" refer to the vertical direction and relates to the locations of the components in question when the wave power unit is in operation.

BACKGROUND OF INVENTION

Wave movements in the sea and in large inland lakes constitute a potential source of energy that has scarcely been exploited so far. However various suggestions have been made to use the vertical movements of the sea for producing electrical power in a generator. Since a point on the sea surface makes a reciprocating vertical movement it is suitable to use a linear generator to produce the electric power.

WO 03/058055 discloses such a wave power unit where the moving part of the generator, i.e. the part that corresponds to the rotor in a rotating generator and in the present application called translator, reciprocates in relation to the stator of the generator. In that disclosure the stator is anchored in the sea bed. The translator is by flexible connection means, such as a wire, cable or a chain connected to a body floating on the sea.

The stator and the translator of the generator are encapsulated in a water-tight housing. Since the generator is located closed to or at the sea bottom service and maintenance thereof is complicated. This requires that the generator is very reliable in operation. Furthermore, in order to provide a competitive energy source in a commercial scale, it is important to minimize the costs for manufacturing and assembling the generator. The requirements on high reliability and low manufacturing costs imply an optimized design and construction of the generator

SUMMARY OF INVENTION

The object of the present invention is to meet the above mentioned demands. In particular the object of the invention is to meet these demands in respect of the relation between the water-tight housing and the interior components of the generator.

This object in the first aspect of the invention is met in that a stator frame of the kind introductionally specified has the specific features that the stator frame includes a cylindrical tube of metal with mounting means for mounting stator packets to the inside wall of the tube, which tube also forms the external circumferential wall of the linear generator.

Such a stator frame fulfils the dual function of forming a part of the encapsulating housing and a safe and rational mounting of the stator. By using a part of the housing as the stator frame the number required components of the generator will be low. The mounting means on the inside of the frame wall allows a rational mounting of the stator packages directly on this frame. The need for a separate stator frame structure thus is eliminated. This results in a much more rational assembly of the generator than if the complete stator first has to be assembled and then inserted into the housing. The invented stator frame therefore contributes to attain low manufacturing cost for the generator as well as a safe construction.

According to a preferred embodiment, the mounting means includes a plurality of axially distributed mounting profiles on the inside wall of the tube, each mounting profile extending in the circumferential direction and having a first group of receiving slots for the stator packets, which receiving slots are spaced by inwardly directed radial projections, all receiving slots of one mounting profile being axially aligned with receiving slots of the other mounting profiles.

Each stator packet in a linear generator of the kind in question forms an elongated unit that is to be mounted in the axial direction. The mounting profile with the receiving slots is advantageously adapted to mount such a unit. The formation of the aligned receiving slots provides a well defined localization of each stator package such that the mounting will be easy and with a minimum risk for mistakes.

According to a further preferred embodiment, each mounting profile is formed by a circumferential rim.

This is a simple way of constructing the mounting profile. The rim will also contribute to strengthen the wall of the tube, which is exposed to high external pressure from the surrounding water when the generator is at operation on the sea bottom.

According to a further preferred embodiment, each rim has a plurality of recesses forming the receiving slots.

The receiving slots are thereby obtained in an easy way.

According to a further preferred embodiment, each mounting profile has a second group of receiving slots for receiving guiding means for a translator to be axially reciprocating in the stator frame.

The translator has to be precisely and safe guided in order to maintain its position in the radial direction for keeping the gaps towards the stator constant. Each guiding means may advantageously consist of a row of wheels journalled in a wheel frame. By providing receiving slots also for these components, the assembly of the generator is further rationalized. Thereby is also achieved a predetermined distinct localization of the guiding means relative to the stator package in the circumferential and, more important, in the radial direction. This simplifies to assure that the gaps will be exact.

According to a further preferred embodiment, the circumferential extension of each receiving slot in the first group is 2-8 times as large as the circumferential extension of each receiving slot in the second group.

Since each stator package normally has a larger circumferential extension than what is required for the guiding means, the specified relation of the width of the slots is an adaption to that. In most cases the slots in the first group are 3-4 times as large as those in the second group.

According to a further preferred embodiment, the number of receiving slots in the second group is three or four in each mounting profile.

The translator has to be radially supported in at least three different directions in order to assure a proper position. In many cases it might be advantageous to have it supported in four directions. This embodiment is an adaption to this requirement.

According to a further preferred embodiment, each receiving slot has a bottom that is a planar surface.

This simplifies the manufacture of the frame, and the planar bottom provides a good support for planar rear sides of the stator packages and the guiding means.

According to a further preferred embodiment, the number of receiving slots in the first group is in the range of 4-12. The number of stator packages in most cases will be within this range, and the mounting means thereby will be well suitable for its particular purpose.

According to a further preferred embodiment, the axial distance between two adjacent mounting profiles is the same for any two adjacent mounting profiles.

The equal distances between the mounting profiles result in a favorable axial distribution of the support forces on the stator packages and the guiding means.

According to a further preferred embodiment, each receiving slot has a bottom that is provided with through holes that reach the outer side of the tube.

This simplifies the attachment of the stator packages and the guiding means in the respective receiving slots by using bolts or the like.

According to a further preferred embodiment, the tube has a plurality of external circumferential flanges.

Thereby the rigidity of the tube and is ability to withstand the external water pressure is increased and allows a thinner wall than without these flanges.

According to a further preferred embodiment, the number of flanges equals the number of mounting profiles.

This is advantageous from the manufacturing point of view.

According to a further preferred embodiment, each flange is axially located close a mounting profile.

The flanges thereby strengthen the tube in those areas, where the tube is exposed to the support forces exerted on the stator packages and the guiding means. The strengthening effect of the flanges thereby is optimized, in particular if the tube is perforated by the bolt holes along the mounting profiles.

According to a further preferred embodiment, the frame includes a plurality of axially distributed sections that are joined together.

In most cases it is convenient when manufacturing the tube, to join sections together due to the normally large dimensions of the housing. Manufacturing the tube from sections also allows a modulization such that housings of different length can be manufactured from one and the same size of sections.

According to a further preferred embodiment, each section includes one mounting profile and one flange, and at least some sections are identical to each other.

Such construction of the sections further contributes to attain modules that can be used for different lengths of the housing.

According to a further preferred embodiment, the tube on its outside has attachment means arranged for attachment to support elements.

The housing of the generator has a considerable height, some ten meters or more, and is exposed to lateral tilting forces at its top caused by the connection means such as a wire that connects the translator to a floating body on the sea surface. It is therefore advantageous to provide support elements, e.g. wires or rods, connecting the upper end of the housing to the sea bottom. By providing attachment means on the exterior of the tube for such support elements, the housing can be easily anchored.

The invention also relates to a wave power unit including at least one floating body and a submerged linear generator with a stator and a translator and further includes flexible connection means connecting the at least one floating body to the translator, whereby the stator includes a stator frame according to the present invention, in particular to any of the preferred embodiments thereof, to which stator frame the stator packets are mounted.

By flexible is meant that the connection means is bendable, such as a chain, wire, rope or the like. It does not necessarily mean that it is flexible in the longitudinal direction.

According to a further preferred embodiment of the invented wave power unit, the translator is guided by a plurality of guiding means, each guiding means being mounted in a receiving slot of the second group in each profile.

According to a further preferred embodiment, each guiding means includes a plurality of axially distributed wheels and a wheel frame, on which the wheels are mounted.

According to a further preferred embodiment, the stator frame is provided with a plurality of support elements connecting the stator frame to the sea bottom.

According to a further preferred embodiment, the support elements include a wires and/or rods.

The invention also relates to a wave power plant that includes a plurality of wave power units according to the present invention.

According to a further preferred embodiment, the wave power plant includes at least one switchgear located at the sea bottom and to which the wave power units are connected.

The invention also relates to an electric network that includes a connection line to a wave power unit according to the present invention.

According to a preferred embodiment, the connection line includes a control unit arranged to control the power supply through the connection line and to provide debiting information regarding the energy supplied through the connection line.

According to the second aspect of the invention a wave power unit provided with a stator frame according to the present invention is used for producing electric power and supplying the power to an electric network.

In the third aspect of the invention, a method of the kind introductionally specified includes the specific measures that the stator frame is formed as a tube of metal and that the stator packets are mounted on the inside wall of the tube.

According to a preferred embodiment of the invented method, guiding means for the translator are mounted on the inside wall of the tube.

According to a further preferred embodiment, the tube is manufactured by attaching a plurality of axially distributed sections to each other.

According to a further preferred embodiment, the step of forming the stator as a cylindrical tube includes that the tube is formed such that the tube has the features of the tube in the invented stator frame, in particular to any of the preferred embodiments thereof.

The invented wave power unit, the invented wave power plant, the invented electrical network, the invented use and the invented method have the advantages of the invented stator frame and the preferred embodiments thereof and which have been described above.

The invented wave power unit gains from the advantages of the invented stator frame and the preferred embodiments thereof and which have been described above.

The above described preferred embodiments of the invention are specified in the dependent claims. It is to be understood that further preferred embodiments of course can be constituted by any possible combination of the preferred embodiments mentioned above and by any possible combination of these and features mentioned in the description of examples below.

The invention will be further explained through the following detailed description of examples thereof and with reference to the accompanying drawings.

SHORT DESCRIPTION OF THE DRAWINGS

Figure 7:
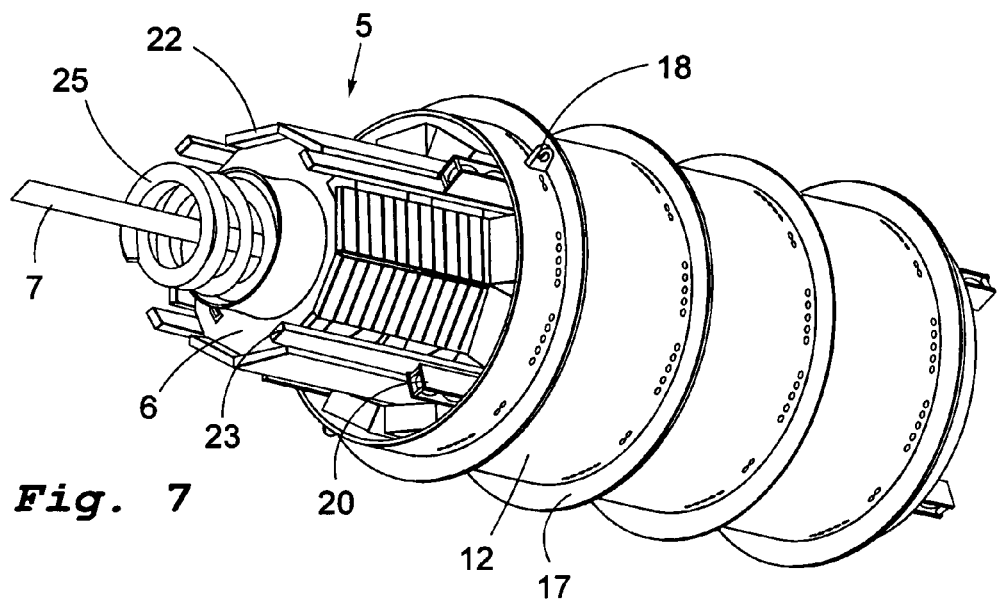

FIG. 7. Is a view in perspective similar to that of FIG. 2 and showing also the translator within the stator frame.

Figure 8:
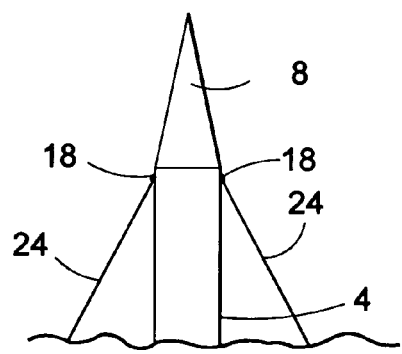

FIG. 8 is a schematic side view of a part of a wave power unit with a stator frame according to a further example of the invention.

Figure 9:
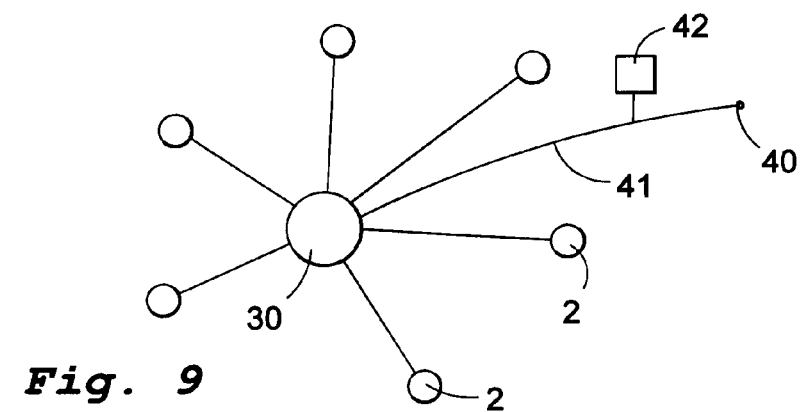

FIG. 9 schematically illustrates a wave power plant according to the invention.

DESCRIPTION OF EXAMPLES

Figure 1:
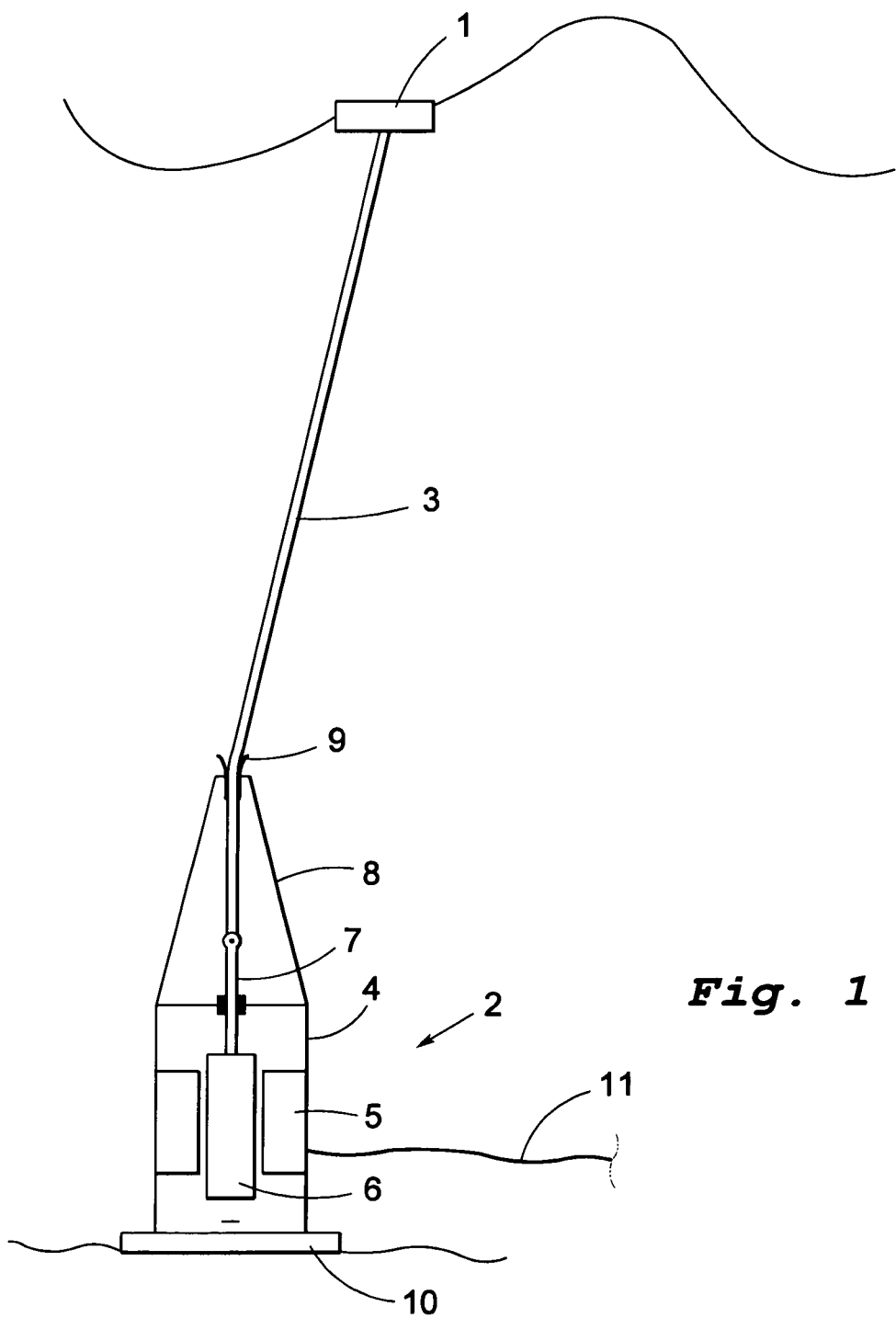
FIG. 1 is a schematic side view of a wave power unit with a linear generator for which the stator frame according to the invention is intended.

FIG. 1 is a schematically side view of a wave-power unit according to the invention at operation in the sea. A floating body 1 floats on the sea surface and is connected by a connection means 3 such as a cable, wire, rope, chain or the like, to a linear generator 2 anchored at the sea bed. In the figure the generator is attached at the sea bed. It is, however, to be understood that the generator can be located above the sea bed and be anchored in some other way.

The linear generator 2 has a stator 5 with windings and a translator 6 with magnets. The translator 6 is able to reciprocate up and down within the stator 5 thereby generating current in the stator windings, which current by an electric cable 11 is transferred to an electric network.

The translator 6 includes a rod 7 to which the wire 3 is attached. When the floating body 1 due to the wave movements of the sea surface is forced to move up, the floating body will pull the translator 6 upwards. When the floating body thereafter moves down the translator 6 will move down through gravity. Optionally but preferably a spring (not shown) or the like acting on the translator 6 provides an additional force downwards.

Since the generator 2 is anchored in the sea bed and the floating body 1 floats freely on the water surface, the floating body is free to move laterally in relation to the generator 2. Thereby the connection means 3 will become inclined.

At the entrance of the connection means 3 into the housing 4 of the generator 2 there is provided a guiding device 9 that guides the connection means to move vertically below the guiding device 9 while allowing the connection means 3 that is above the guiding device to move in an inclined position. The guiding device 9 is attached to a conical construction 8 above the housing 4 of the generator and attached thereto.

The guiding device 9 allows the connection means 3 to gradually change its direction when passing through guiding device 9, such that the wear of the connection means becomes limited.

Figure 2:
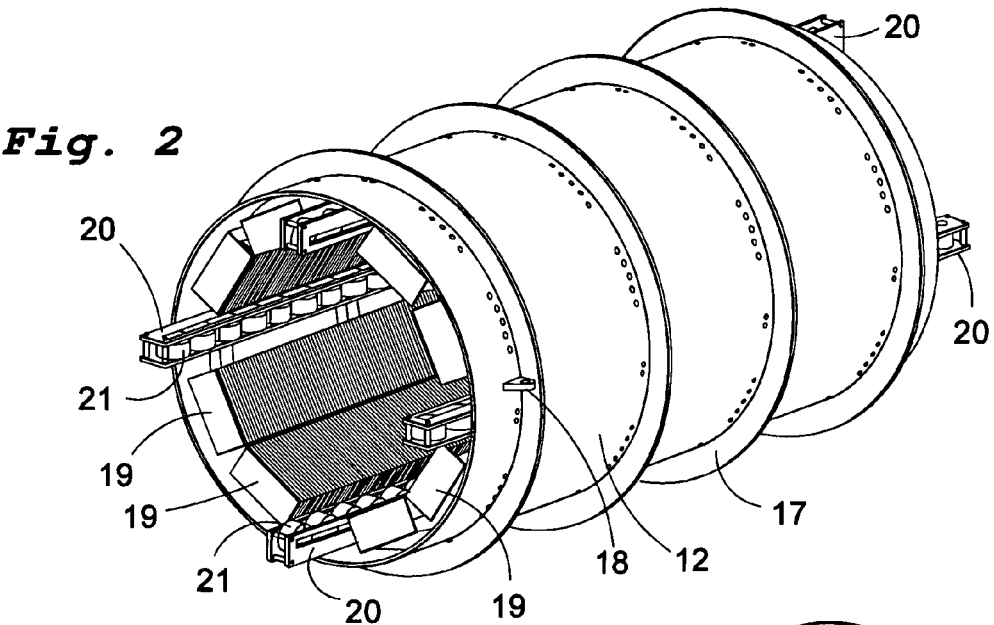
FIG. 2 is a view in perspective of a stator frame according to the invention with stator packets mounted thereon.

In FIG. 2 the stator frame 12 is shown with stator packages 19 and guiding means 20, 21 for the translator. The stator frame 12 forms a part of the water-tight housing 4 in which the linear generator is encapsulated. It is to be understood that a top end wall and a bottom end wall is to be attached to the ends of the stator frame 12 to complete the housing 4. The stator frame 12 is of metal, e.g. stainless steel or iron with anticorrosive external coating.

Mounted on the inside of the stator frame 12 is a plurality of axially extending stator packages 19, in the shown example eight. Also mounted on the inside of the stator frame 12 there are four axially extending guiding means 20, 21 for guiding the movement of the translator 6 (not shown in FIG. 2) when it reciprocates. Each guiding means consists of a large number of wheels 21 arranged in an axially extending row. Each wheel 21 is journalled in a wheel frame 20. In operation the wheels 21 roll on a respective support rail on the translator 6 such that the lateral position of the translator 6 will be precisely maintain in order to maintain the gaps between the translator magnets 22 and the stator packages 19 accurate.

Figure 3:
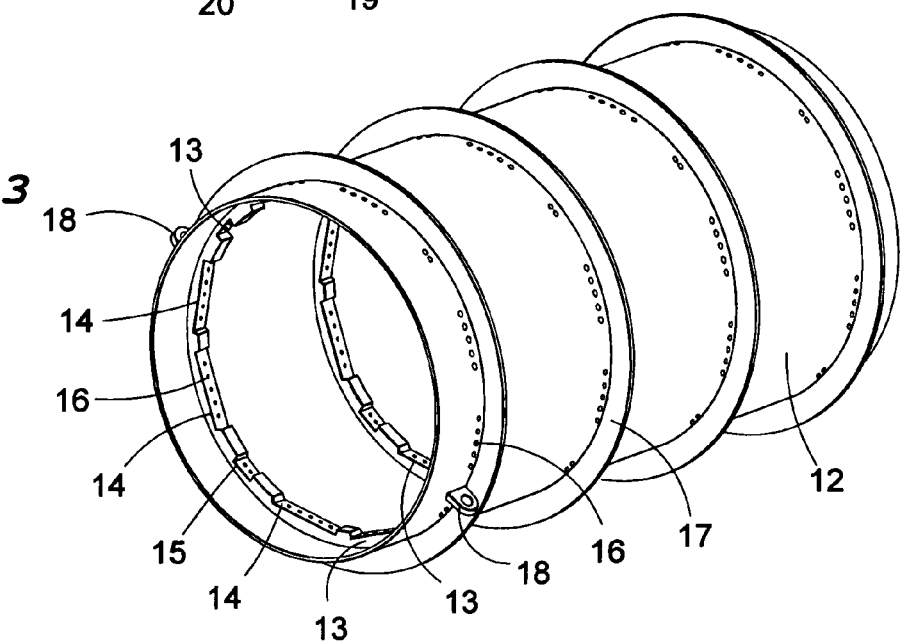
FIG. 3 is a view similar to that of FIG. 2 showing the stator frame without components mounted therein.

With reference to FIG. 3 the mounting of the stator packages 19 and the wheel frames 20 on the inside of the wall of the stator frame 12 is explained. The inside of the stator frame 12 is for that purpose provided with mounting means. The mounting means consists of a plurality of mounting profiles 13, 14, 15 that are axially distributed along the stator frame. In the figure only two of these mounting profiles are visible. Each mounting profile consists of a rim 13 that can be an integral part of the wall of the stator frame 12, or it can be welded or attached in some other way thereto. Each rim 13 has a plurality of recesses. A first group of recesses is arranged to form receiving slots 14, in which the stator packets 19 are to be mounted. A second group of recesses is arranged to form receiving slots 15, in which the wheel frames 20 of the guiding means are to be mounted. The number of receiving slots 14 in the first group is eight and the number of receiving slots 15 in the second group is four, to correspond to the number of the respective component as shown in FIG. 2. It is, however to be understood that the number of slots in each group can deviate from the illustrating example.

The number of rims 13 in the shown examples is four, but also this number can vary in dependence of the length of the stator frame. Preferably, but not necessarily the distance between each two adjacent rims 13 is the same. The skilled person understands that the mounting means can be configured and constructed in many other ways than shown in the example.

The circumferential extension of the receiving slots 14 for the stator packages 19 is larger than the circumferential extension of the receiving slots 15 for the guiding means 20, 21 to correspond to the width of the respective component. In the shown example the width of each stator packets is about three times the width of each guiding means 20, 21. This relation however can vary widely. If for example there is only four stator packages their relative with is much larger than that.

At the bottom of each receiving slot 14, 15 there are bolt holes 16 extending through the wall of the stator frame 12, and these holes 16 thus are visible also in the figure on the outside of the stator frame 12. By bolts through these holes the attachment of the stator packages 19 and the wheel frames 20 is secured.

At the outside the stator frame 12 has a number of flanges 17 to increase the stiffness and strength of the stator frame. In the shown example each flange 17 is located adjacent one of the rims 13, but of course another distribution is possible. Also on the outside there are provided lugs forming attachment means 18 for supporting elements, e.g. wires or rods. The lugs are located at the end of the stator frame 12 that will be the upper end when located for operation at the see bottom.

Figure 4:
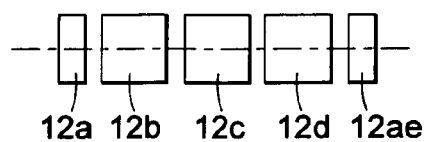
FIG. 4 is schematically illustrating a manufacturing step according to an alternative example.

The stator frame 12 can in principle be manufactured in one piece. For practical reasons it is advantageous to make it in sections as illustrated in FIG. 4, schematically illustrating five sections 12a-12e that are to be joined together to form a complete stator frame 12. In this example the three middle sections 12b-12d are identical, and each has a rim and a flange. By this modulized manufacturing, stator frames of different lengths can be assembled.

Figure 5:
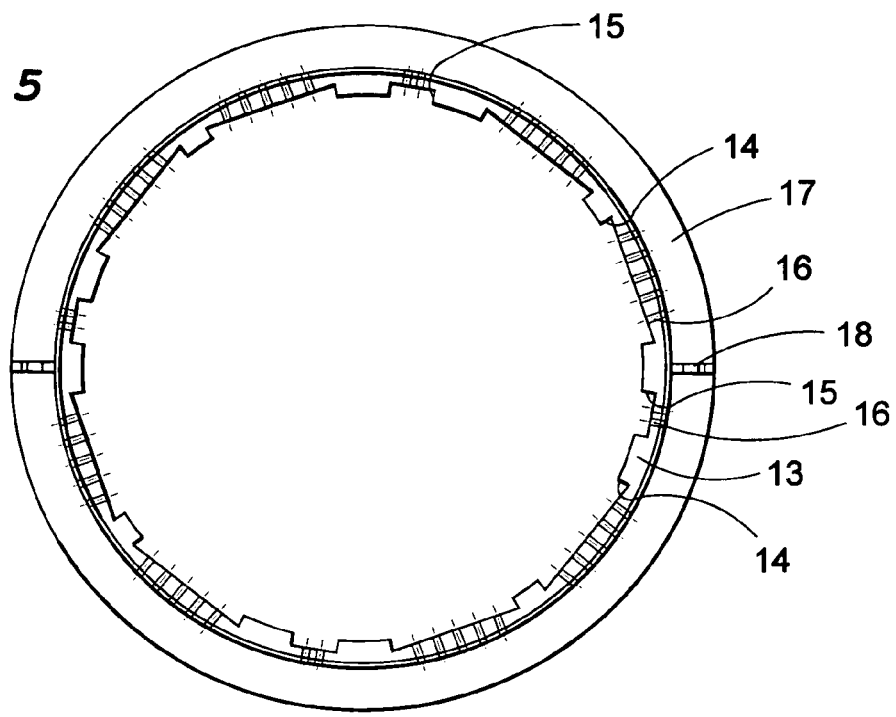
FIG. 5 is an end view of the stator frame of FIG. 3.

The shape of the rims 13 can be seen more in detail in FIG. 5.

Figure 6:
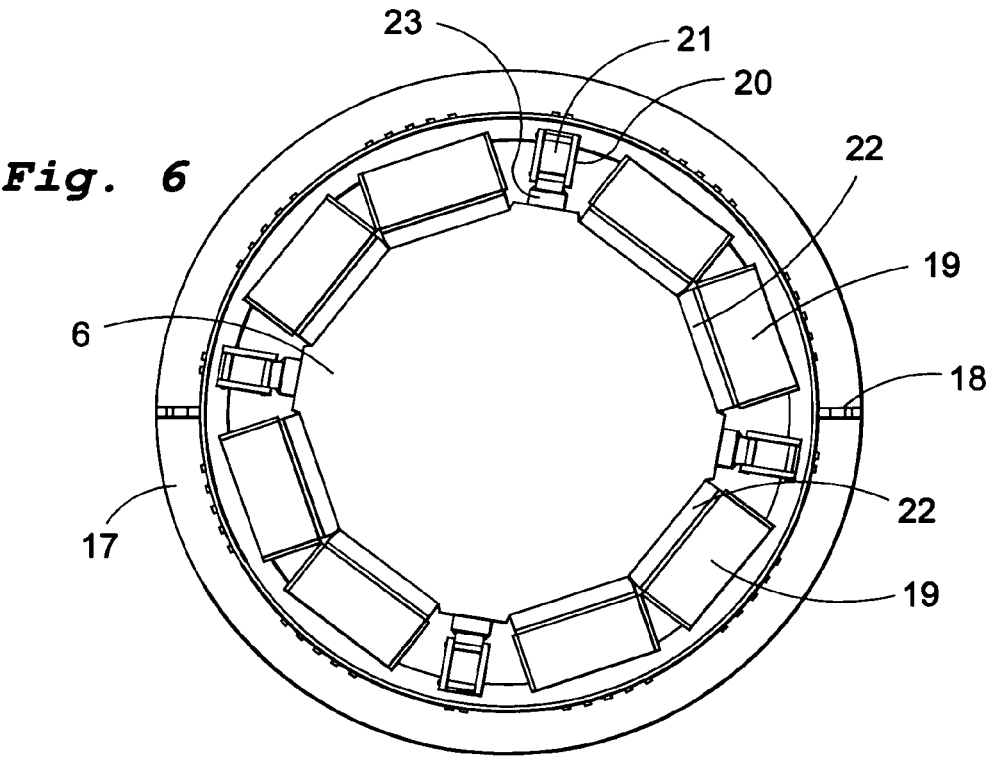
FIG. 6 is a view similar to that of FIG. 5 showing the stator frame with stator packages mounted thereon and with the translator therein.

In FIG. 6 is illustrated the relationship between the translator 6 and the components associated with the stator frame 12. On the translator there are rows of magnets 22, each row cooperating with a respective stator package 19 to form a small gap between them such that current is induced in the stator windings as the magnets 22 reciprocate axially with the translator 6. The gaps are defined and kept stable by the guiding device 20, 21, the wheels of which roll on the rails 23 attached to the translator 6.

The perspective view of FIG. 7 further illustrates the translator 6 partly reaching out from the stator frame 12 and depicts also the rod 7, through which the translator 6 is connected to the wire 3 and further up to the floating body 1, c.f. FIG. 1. At the upper end of the translator 6 there is a spring 25 to dampen the movement when the translator reaches its maximum upper end position.

As illustrated in FIG. 8, the housing 4 of the linear generator preferably is secured by wires or rods 24 to the sea bottom. The wires/rods 24 are attached to the lugs 18 at the upper end of the stator frame.

In FIG. 9 a wave power plant is schematically illustrated as seen from above. The plant has a plurality of linear generators 2, each being a part of a wave power unit of the general type as shown in FIG. 1 and being provided with a stator frame 12 according to the present invention. The generators 2 are connected to a switchgear 30 which by a connection line 41 is connected to an electric network 40.

The connection line is provided with a control unit 42 controlling the power supply from the generators 2 via the switchgear 30 to the electric network 40. The control unit 42 also records the amount of power supplied to the electric network for billing purposes.

The invention claimed is:

1. A stator frame for a submersible linear generator, wherein the stator frame includes a cylindrical tube of metal with mounting means for mounting stator packets to the inside wall of the tube, wherein the tube also constitutes an outer circumferential wall of the linear generator when assembled to forms a part of a water-tight housing in which the linear generator is encapsulated, wherein the mounting means includes a plurality of axially distributed mounting profiles on the inside wall of the tube, each mounting profile extending in the circumferential direction and having a first group of receiving slots for the stator packets, wherein the receiving slots in the first group are spaced by inwardly directed radial projections, all receiving slots in the first group of one mounting profile being axially aligned with receiving slots in the first group of the other mounting profiles.

2. The stator frame according to claim 1, wherein each mounting profile is formed by a circumferential rim.

3. The stator frame according to claim 2, wherein each rim has a plurality of recesses forming said receiving slots in the first group.

4. The stator frame according to claim 1, wherein each mounting profile has a second group of receiving slots for receiving guiding means for a translator to be axially reciprocating in the stator frame.

5. The stator frame according to claim 4, wherein the circumferential extension of each receiving slot in the first group is 2 to 8 times as large as the circumferential extension of each receiving slot in the second group.

6. The stator frame according to claim 5, wherein the number of receiving slots in the second group is three or four in each mounting profile.

7. The stator frame according to claim 1, wherein each receiving slot in the first group has a bottom that is a planar surface.

8. The stator frame according to claim 1, wherein the number of receiving slots in the first group is in the range of 4 to 12.

9. The stator frame according to claim 1, wherein the axial distance between two adjacent mounting profiles is the same for any two adjacent mounting profiles.

10. The stator frame according to claim 1, wherein each receiving slot in the first group has a bottom that is provided with through holes that reach to the outer side of the tube.

11. The stator frame according to claim 1, wherein the tube has a plurality of external circumferential flanges.

12. The stator frame according to claim 11, wherein the number of flanges equals the number of mounting profiles.

13. The stator frame according to claim 12, wherein each flange is axially located close to a mounting profile.

14. The stator frame according to claim 1, wherein the stator frame includes a plurality of axially distributed sections that are joined together.

15. The stator frame according to claim 14, wherein each section includes one mounting profile and one flange, and in that at least some sections are identical with each other.

16. The stator according to claim 1, wherein the tube on its outside has attachment means arranged for attachment to support elements.

17. A wave power unit comprising at least one floating body and a submersible linear generator with a stator and a translator, and further includes flexible connection means connecting the at east one floating body to the translator, wherein the stator has a stator frame according to claim 1, to which stator frame the stator packets are mounted.

18. The wave power unit according to claim 17, wherein the translator is guided by a plurality of guiding means, each guiding means being mounted in a respective receiving slot of the second group in each mounting profile.

19. The wave power unit according to claim 18, wherein each guiding means includes a plurality of axially distributed wheels and a wheel frame on which the wheels are mounted.

20. The wave power unit according to claim 17, wherein the stator frame is provided with a plurality of support elements connecting the stator frame to the sea bottom.

21. The wave power unit according to claim 20, wherein the support elements include wires and/or rods.

22. A wave power plant, comprising a plurality of wave power units according to claim 17.

23. The wave power plant according to claim 22, including at least one switchgear located at the sea bottom, and to which the wave power units are connected.

24. An electrical network, including a connection line and a wave power unit according to claim 17.

25. The electric network according to claim 24, wherein the connection line includes a control unit arranged to control the power supply through the connection line and to provide debiting information regarding the energy supplied through the connection line.

26. The use of a wave power unit according to claim 17 for producing electric power and supplying the power to an electric network.

27. A method for manufacturing a linear generator intended for submerged use, the linear generator having a stator with a stator frame and stator packets and having a translator, which method, includes arranging the translator to reciprocate within the stator including forming the stator frame as a cylindrical tube of metal constituting an outer circumferential wall of the linear generator when assembled to form a part of a water-tight housing in which the linear generator is encapsulated and mounting the stator packets on the inside wall of the tube using mounting means, wherein the mounting means includes a plurality of axially distributed mounting profiles of the inside wall of the tube, each mounting profile extending in the circumferential direction and having a first group of receiving slots for the stator packets, wherein the receiving slots in the first group are spaced by inwardly directed radial projections, all receiving slots in the first group of one mounting profile being axially aligned with receiving slots in the first group of the other mounting profiles.

28. The method according to claim 27, including mounting guiding means for the translator on the inside wall of the tube.

29. The method according to claim 27, wherein the tube is manufactured by attaching a plurality of axially distributed sections to each other.

30. The stator frame according to claim 4, wherein each receiving slot in the second group has a bottom that is a planar surface.

31. The stator frame according to claim 4, wherein each receiving slot in the second group has a bottom that is provided with through holes that reach to the outer side of the tube.

\* \* \* \* \*